O. O. STORLE.
TRANSMISSION GEARING.
APPLICATION FILED FEB. 19, 1917.

1,310,935.

Patented July 22, 1919.
2 SHEETS—SHEET 1.

Inventor:
Ole O. Storle,
By Flanders Bottum Fawsett & Bottum
Attorneys.

O. O. STORLE.
TRANSMISSION GEARING.
APPLICATION FILED FEB. 19, 1917.
1,310,935.
Patented July 22, 1919.
2 SHEETS—SHEET 2.
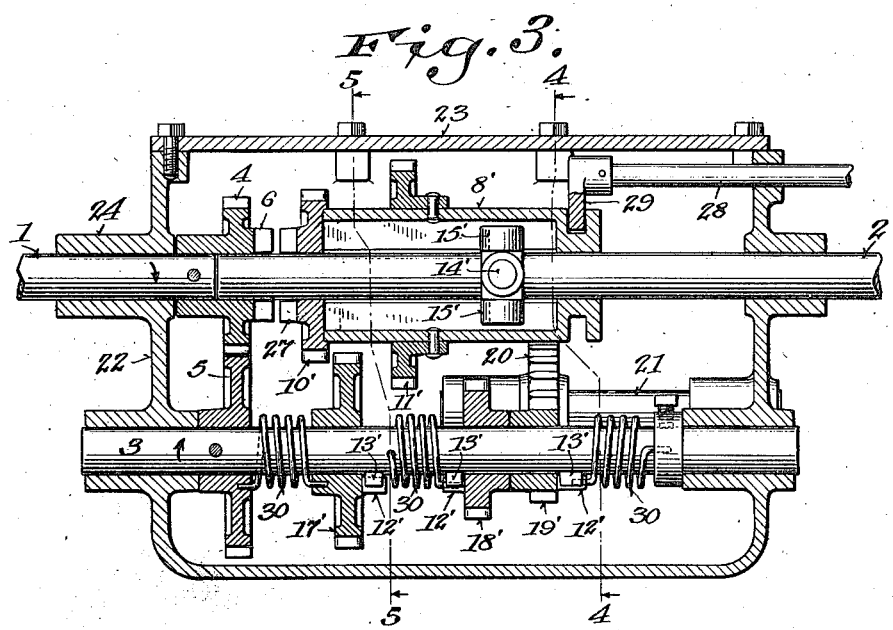
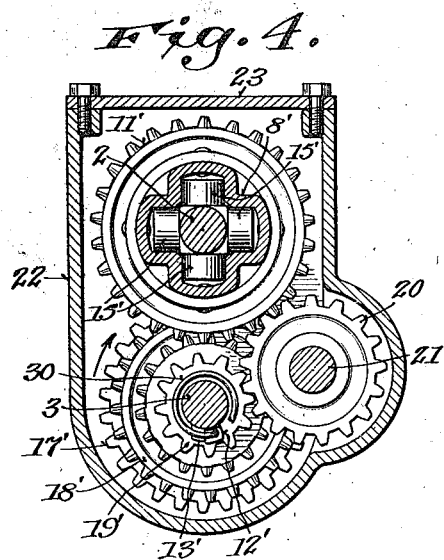
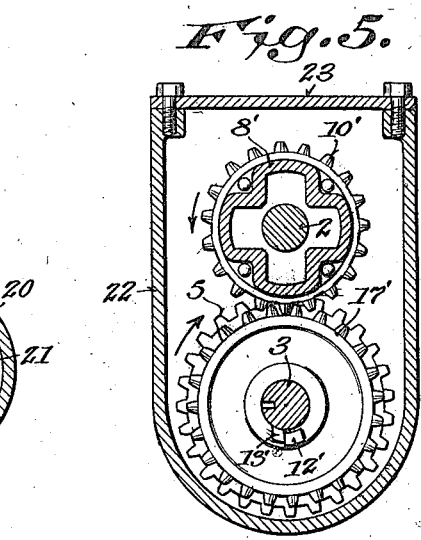
Inventor:
Ole O. Storle,
By Flanders Bottum Fawsett & Bottum
Attorneys.

UNITED STATES PATENT OFFICE.

OLE O. STORLE, OF TACOMA, WASHINGTON, ASSIGNOR TO THE STORLE ENGINE COMPANY, OF KEWAUNEE, WISCONSIN, A CORPORATION OF WISCONSIN.

TRANSMISSION-GEARING.

1,310,935.            Specification of Letters Patent.          Patented July 22, 1919.

Application filed February 19, 1917. Serial No. 149,387.

*To all whom it may concern:*

Be it known that I, OLE O. STORLE, a citizen of the United States, residing at Tacoma, in the county of Pierce and State of Washington, have invented certain new and useful Improvements in Transmission-Gearings, of which the following is a specification, reference being had to the accompanying drawing, forming a part thereof.

This invention relates more particularly to variable speed transmission gearing of the sliding gear type.

The main objects of the invention are to facilitate shifting the gears for varying the speed or reversing the movement of the driven shaft or member; to prevent stripping or injuring the gears when they are thrown into mesh with one another; and generally to simplify and improve the construction and operation of gearing of this class.

In the accompanying drawing like characters designate the same parts in the several figures.

Figure 1:
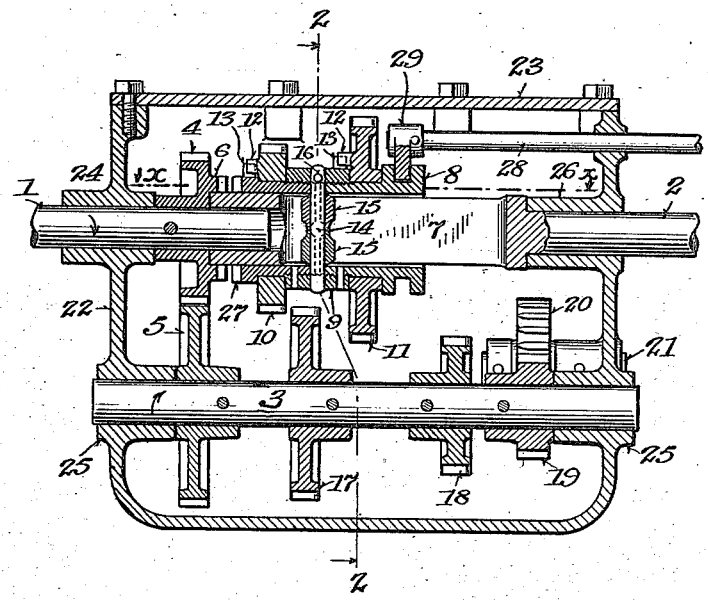
Figure 2:
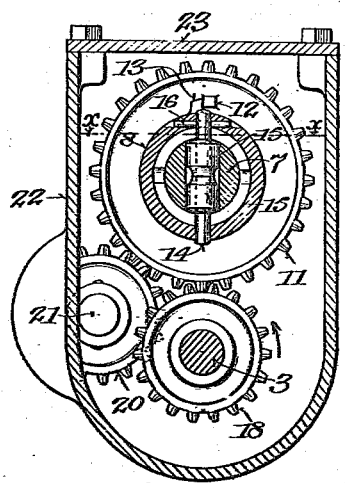

Figure 1 is a vertical longitudinal section of a preferred form of transmission gearing embodying the invention as specially designed for motor vehicles; Fig. 2 is a vertical cross section on the line 2—2, Fig. 1; Fig. 3 is a vertical longitudinal section of a modified form of transmission gearing embodying the invention; and Figs. 4 and 5 are vertical cross sections on the lines 4—4 and 5—5 respectively, Fig. 3.

Referring to Figs. 1 and 2 of the drawing, the gearing comprises a power or driving shaft or member 1, a driven shaft or member 2 in axial alinement with the shaft 1, and a counter shaft 3 parallel with the shafts 1 and 2. The driving shaft 1 has a gear 4, fixed thereon in constant mesh with a gear 5 fixed on the shaft 3, and is provided with a clutch member 6, which may be formed as shown, integrally with the gear 4.

The driven shaft 2 is formed or provided adjacent to the shaft 1, with a longitudinally slotted section 7, on which is slidably mounted a shifting sleeve or member 8, preferably composed of two externally threaded sections connected end to end with each other by an internally threaded collar 9.

The shifting sleeve or member is provided with a number of gears of different sizes, in the present case two gears, 10 and 11, which are capable of limited angular movement thereon, but are restrained from displacement lengthwise by shoulders on the shifting sleeve or member and the intervening collar 9, which serves as a spacing member. In the present case the angular movement of these gears independently of the sleeve or shifting member 8 is limited by lugs 12 on the gears and lugs 13 on the sleeve or shifting member, so constructed and arranged as to allow nearly one complete revolution of each gear relative to the sleeve or member 8.

The sleeve or member 8 is held against turning on the shaft 2 by a pin 14, passing through the collar 9 and registering notches in the threaded ends of the sleeve sections, which are thereby locked in adjusted relation to each other. The pin 14, which passes freely through the slot in the shaft 2, is provided therein with rollers 15, which when power is transmitted through said sleeve to the driven shaft, bear on opposite sides of the slot in said shaft, thereby distributing the torque to opposite sides of the axis of the sleeve and shaft, avoiding or reducing friction and wear and facilitating the shifting of the sleeve or member 8 with the gears 10 and 11. The pin 14 is fastened and held in place by any suitable means such as a pin 16, as shown in Fig. 2.

The counter shaft 3 is provided with gears 17 and 18, with which the gears 10 and 11 respectively are adapted to be shifted into mesh one at a time, for varying the speed of the driven shaft 2 for a constant or any given speed of the driving shaft 1.

For reversing the direction of rotation of the shaft 2, the shaft 3 is provided with a gear 19 fixed thereon in constant mesh with an idle or reversing gear 20, mounted on a stud or short shaft 21, parallel with the shaft 3, and in position to mesh with the gear 11 when the latter is shifted to one limit of its movement or into the required position for reversing the shaft 2. All the gears are housed in a case 22, which is provided with a removable cover 23 and with bearings 24, 25 and 26 for the shafts 1, 2 and 3, and is designed to contain a lubricant in which the gears are to run, as indicated by the dotted line *x*.

The sleeve or member 8 is formed or provided with a clutch member 27 to coöperate with the clutch member 6 for directly connecting the driving shaft 1 with the driven shaft 2. The sleeve or shifting member with the gears 10 and 11 and the clutch member 27, may be shifted and locked in different positions by any suitable means such as a rod 28 having a sliding bearing in one end of the gear case 22 parallel with the shaft 2, and provided at its inner end with a fork 29 or the like, engaging with a groove in the sleeve 8. This rod is connected with a lever or other means not shown, for operating and locking it in different positions.

In the operation of the gearing, when the sleeve, or shifting member 8 is in the position shown in Fig. 1, the shaft 2 remains quiescent, while the power or driven shaft 1 and the counter shaft 3, with the gears thereon, run idly. By shifting the sleeve 8 to the right into position to carry the gear 11 into mesh with the gear 18, the gear 11 will be turned idly on the sleeve 8 without effect on the shaft 2, for nearly a complete revolution, or until the lug 12 is carried around into engagement with the lug 13, whereupon the sleeve will be picked up with the shaft 2 and turned at a slow speed, according to the relative sizes of said gears.

If now it is desired to reverse the shaft 2 for running the car or vehicle backward, the sleeve 8 is moved farther to the right to carry the gear 11 into mesh with the idle or reversing gear 20, whereupon the gear 11 will be turned backward idly on the sleeve 8 for nearly a complete revolution, until the lug 12 thereon is brought into engagement with the opposite side of the lug 13 on the sleeve, as shown in Fig. 1, whereupon the sleeve with the shaft 2 will be picked up and turned in the reverse direction.

For running at an intermediate speed, the sleeve 8 is shifted into position to bring the gear 10 into mesh with the gear 17, whereupon the gear 10 will be turned idly on said sleeve until the lug 12 is carried around into engagement with the lug 13, whereupon said sleeve with the shaft 2 will be picked up and turned at the intermediate speed.

In thus shifting the gears 10 and 11 bodily with the sleeve 8 for low or intermediate speed or for reversing, the shifting gear 10 or 11 will be brought while it is running idly, into full mesh with the gear 17, 18 or 20, before the shaft 2 is picked up and turned, thereby greatly facilitating the engagement of the gears and avoiding stripping, mutilating or injuring them.

By shifting the sleeve 8 to the extreme left, the clutch member 27 is brought into engagement with the clutch member 6, thereby connecting the shaft 2 directly with the shaft 1 for high speed.

The sleeve 8 may be shifted instantly by a single movement of the operating lever from either extreme or any intermediate position to the other extreme or any intermediate position, the teeth of the shifting gears 10 and of the gears 17, 18 and 20 with which they coöperate being all pointed or beveled at the sides of the gears, and the teeth of the gears 10 and 11 passing freely between the teeth of the gears 17 and 18 in shifting across intermediate positions.

The shifting gears 10 and 11, when run in a stiff or heavy lubricant which acts as a drag thereon, lag behind until they are picked up and driven by engagement of the lugs 13 on the sleeve 8, with the lugs 12 on said gears, so that when either of said gears is shifted into engagement with the gear 17 or 18 it will be turned idly on the sleeve 8 until the lug 12 is carried around into engagement with the lug 13 before it is subjected to the work of transmitting power to the shaft 2.

Without using a stiff or heavy lubricant in the gear case, the necessary drag on the shifting gears 10 and 11 to cause them to lag behind when they are not working till they are picked up by engagement of the lugs 13 on the sleeve 8 with the lugs 12 on the gears, may be provided by any other means, such as springs or friction brakes.

Referring to Figs. 3, 4 and 5, showing a modification of the gearing, the gears 17', 18' and 19' are loosely mounted on the counter shaft 3 so as to be capable of a limited angular movement relative thereto, and are connected therewith by spiral springs 30, which tend to turn them forward and to hold the lugs 12' on the gears in engagement with the lugs 13' on the shaft. The shifting sleeve or member 8', slidably mounted on the driven shaft 2, is formed with longitudinal channels engaged by rollers 15' mounted on studs 14' projecting radially from said shaft. The shifting gears 10' and 11' are in this case rigidly mounted on or attached to the sleeve or shifting member 8'.

In the operation of this form of gearing, when one of the gears, as for example, the gear 10', is shifted with the sleeve or member 8' into mesh with the corresponding gear, as for example, the gear 17' on the counter shaft, while the engine or power shaft 1 is running, the gear 17' will remain stationary until the lug 13' on the shaft 3 is carried around into engagement with the lug 12' on the gear, thereby allowing said gears to be brought into complete mesh before they are subjected to work.

In shifting the gear 11' into engagement with the gear 18' for low speed, or into engagement with the gear 20 for reversing, the gear 18' or the gear 19' dwells, until it is picked up by engagement of the corresponding lug 13' on the shaft 3, with the lug 12' on the gear, thus permitting the gears to be brought into complete mesh before they are subjected to driving strain.

In other respects this modified form of gearing is substantially like that hereinbefore described and shown in Figs. 1 and 2, in principle, construction and operation.

Various changes in details of construction and arrangement of parts other than those specifically shown and described may be made, without departure from the principle and scope of the invention as defined in the following claims.

I claim:

1. In transmission gearing the combination of parallel shafts provided with gears of different sizes, the gears on one shaft being shiftable bodily lengthwise thereof into and out of mesh one at a time with corresponding gears on the other shaft and the gears on the driven shaft being capable of a limited angular movement relative to that shaft and a housing inclosing said gears and containing a stiff lubricant which serves as a drag on the driven gears and causes each of said gears to lag behind when it is not engaged by the corresponding driving gear.

2. In transmission gearing the combination of parallel shafts, a shifting member mounted on and movable lengthwise of one shaft and having a roller driving connection therewith, gears of different sizes mounted on the other shaft, and corresponding gears mounted on said shifting member and all movable therewith into and out of mesh one at a time with the other gears, one of each pair of coacting gears being capable of a limited angular movement relative to the shaft on which it is mounted.

3. In transmission gearing the combination of driving, driven and counter shafts, gears connecting the driving and counter shafts, a shifting member mounted on and movable lengthwise of the driven shaft and having a roller driving connection therewith, gears of different sizes mounted on the counter shaft, corresponding gears mounted on the shifting member and all movable therewith into and out of mesh one at a time with gears on the counter shaft, one of each pair of coacting gears on the counter shaft and shifting member being capable of a limited angular movement relative to the part on which it is mounted, and means tending to hold back the angularly shiftable gears when they run idly.

4. In transmission gearing the combination of driving and driven shafts arranged in axial alinement with each other, a counter shaft parallel with the other shafts and connected by gears with the driving shaft, a shifting member mounted on and movable lengthwise of the driven shaft and having a roller driving connection therewith, clutch members on the driving shaft and shifting member for directly connecting the driven shaft with the driving shaft in one position of the shifting member, gears of different sizes mounted on the counter shaft, corresponding gears mounted on the shifting member and movable therewith into and out of mesh one at a time with gears on the counter shaft, one gear of each coacting pair on the shifting member and counter shaft being capable of a limited angular movement relative to the part on which it is mounted, and means tending to hold back the angularly adjustable gears when they run idly.

5. In transmission gearing the combination of a driven shaft, a counter shaft parallel therewith, a shifting member mounted and movable axially on the driven shaft and having a roller driving connection therewith, gears of different sizes mounted on the counter shaft, a reversing gear in constant mesh with a gear on the counter shaft, gears mounted on the shifting member movable therewith into and out of mesh one at a time with gears on the counter shaft and the reversing gear, one of each pair of coacting gears for transmission of power from the counter shaft to the driven shaft being capable of a limited angular movement relative to the part on which it is mounted, and means tending to hold back the angularly shiftable gears when they run idly.

In witness whereof I hereto affix my signature.

OLE O. STORLE.